United States Patent
Massuh

(10) Patent No.: US 9,323,854 B2
(45) Date of Patent: Apr. 26, 2016

(54) METHOD, APPARATUS AND SYSTEM FOR LOCATION ASSISTED TRANSLATION

(75) Inventor: Lucas A. Massuh, Cordoba, AR (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 12/317,225

(22) Filed: Dec. 19, 2008

(65) Prior Publication Data

US 2010/0161311 A1    Jun. 24, 2010

(51) Int. Cl.
*G06F 17/20* (2006.01)
*G06F 17/30* (2006.01)
*G06F 17/28* (2006.01)

(52) U.S. Cl.
CPC .......... *G06F 17/3087* (2013.01); *G06F 17/289* (2013.01); *G06F 17/20* (2013.01)

(58) Field of Classification Search
USPC ................. 704/1–10; 340/988–996; 701/1–2, 701/200–266, 300
See application file for complete search history.

(56) References Cited

U.S. PATENT DOCUMENTS

| | | | | |
|---|---|---|---|---|
| 4,542,478 | A | * | 9/1985 | Hashimoto et al. ............... 704/6 |
| 4,636,977 | A | * | 1/1987 | Ikemoto et al. .................... 704/3 |
| 4,791,587 | A | * | 12/1988 | Doi .................................... 704/2 |
| 5,224,040 | A | * | 6/1993 | Tou .................................... 704/2 |
| 5,321,607 | A | * | 6/1994 | Fukumochi et al. ............... 704/4 |
| 5,359,707 | A | * | 10/1994 | Sato ............................. 715/246 |
| 5,506,897 | A | * | 4/1996 | Moore et al. ............. 379/220.01 |
| 5,535,120 | A | | 7/1996 | Chong et al. |
| 5,550,741 | A | * | 8/1996 | Nakajima ........... G06F 17/2836 715/271 |

(Continued)

FOREIGN PATENT DOCUMENTS

| | | |
|---|---|---|
| CN | 1934565 A | 3/2007 |
| EP | 2199928 A1 | 6/2010 |

(Continued)

OTHER PUBLICATIONS

European Search Report received for European Patent Application 09252783.7, mailed on Apr. 14, 2010, 4 pages.

(Continued)

*Primary Examiner* — Pierre-Louis Desir
*Assistant Examiner* — David Kovacek
(74) *Attorney, Agent, or Firm* — Barnes & Thornburg LLP

(57) ABSTRACT

A method, apparatus and system may enhance translation results from translation applications running on mobile devices. Specifically, according to one embodiment, location data may be automatically identified by a location awareness or location detection scheme (e.g., Global Positioning System or GPS, WiFi and/or 3G) on the device or coupled to the device. The location data may be utilized by the enhanced translation scheme according to an embodiment of the invention to pin point the specific physical geographical location of the device. Thereafter, if an enhanced local language dictionary exists that includes any local dialect details, the enhanced local language dictionary may be downloaded to the device. When the user desires to translate a word and/or phrase, the device may look up the meaning in the downloaded enhanced local language dictionary, thus ensuring that the translation is specific to that geographic location. When the user moves locations, the device may download additional "local" language dictionaries, such that the user may accurately translate words even when moving amongst regions with significantly varying meaning for the same words.

22 Claims, 3 Drawing Sheets

(56) References Cited

U.S. PATENT DOCUMENTS

| | | | |
|---|---|---|---|
| 5,636,325 A * | 6/1997 | Farrett | 704/258 |
| 5,664,206 A * | 9/1997 | Murow et al. | 704/8 |
| 5,721,938 A * | 2/1998 | Stuckey | G06F 17/271 704/2 |
| 5,839,106 A * | 11/1998 | Bellegarda | 704/257 |
| 5,956,711 A * | 9/1999 | Sullivan et al. | |
| 6,023,670 A * | 2/2000 | Martino | G06F 17/2715 704/1 |
| 6,121,924 A * | 9/2000 | Meek et al. | 342/357.43 |
| 6,125,341 A * | 9/2000 | Raud et al. | 704/8 |
| 6,192,332 B1 * | 2/2001 | Golding | G06F 15/025 704/10 |
| 6,219,632 B1 * | 4/2001 | Schumacher et al. | 704/2 |
| 6,240,170 B1 * | 5/2001 | Shaffer et al. | 379/142.15 |
| 6,243,675 B1 * | 6/2001 | Ito | 704/232 |
| 6,360,167 B1 * | 3/2002 | Millington et al. | 701/211 |
| 6,385,586 B1 * | 5/2002 | Dietz | G06F 17/289 704/251 |
| 6,438,515 B1 * | 8/2002 | Crawford et al. | 704/5 |
| 6,532,442 B1 * | 3/2003 | Schumacher et al. | 704/2 |
| 6,598,021 B1 * | 7/2003 | Shambaugh et al. | 704/270 |
| 6,816,857 B1 * | 11/2004 | Weissman | G06F 17/30684 |
| 6,912,545 B1 | 6/2005 | Lundy et al. | |
| 7,058,626 B1 * | 6/2006 | Pan et al. | |
| 7,149,964 B1 * | 12/2006 | Cottrille et al. | 715/234 |
| 7,376,636 B1 * | 5/2008 | Wang et al. | 707/694 |
| 7,630,898 B1 * | 12/2009 | Davis et al. | 704/266 |
| 7,643,985 B2 * | 1/2010 | Horvitz | 704/2 |
| 7,813,873 B2 * | 10/2010 | Smartt et al. | 701/208 |
| 7,895,030 B2 * | 2/2011 | Al-Onaizan et al. | 704/2 |
| 8,024,179 B2 * | 9/2011 | Pulz et al. | 704/10 |
| 8,214,197 B2 * | 7/2012 | Kamatani et al. | 704/2 |
| 8,700,998 B2 * | 4/2014 | Togami, Jr. | 715/264 |
| 2001/0014902 A1 * | 8/2001 | Hu et al. | 707/540 |
| 2001/0029455 A1 * | 10/2001 | Chin | G06F 17/273 704/277 |
| 2001/0047255 A1 * | 11/2001 | Fuji | 704/10 |
| 2001/0056352 A1 * | 12/2001 | Xun | 704/277 |
| 2002/0026456 A1 * | 2/2002 | Bradford | G06F 17/2785 715/210 |
| 2002/0052748 A1 * | 5/2002 | Portilla | G06F 17/2785 704/270 |
| 2002/0082844 A1 * | 6/2002 | Van Gestel | 704/275 |
| 2002/0111786 A1 * | 8/2002 | Sugeno et al. | 704/1 |
| 2002/0111794 A1 * | 8/2002 | Yamamoto et al. | 704/200 |
| 2002/0111933 A1 * | 8/2002 | Noble et al. | 707/1 |
| 2002/0116175 A1 * | 8/2002 | Stouffer et al. | 704/9 |
| 2002/0128820 A1 * | 9/2002 | Goronzy et al. | 704/10 |
| 2003/0065504 A1 * | 4/2003 | Kraemer et al. | 704/8 |
| 2003/0097250 A1 * | 5/2003 | Chino | G06F 3/038 704/1 |
| 2003/0149557 A1 * | 8/2003 | Cox et al. | 704/2 |
| 2003/0158722 A1 * | 8/2003 | Lord | G06F 17/289 704/3 |
| 2003/0236658 A1 * | 12/2003 | Yam | 704/2 |
| 2004/0006478 A1 * | 1/2004 | Alpdemir et al. | 704/275 |
| 2004/0044517 A1 * | 3/2004 | Palmquist | G06F 17/2809 704/7 |
| 2004/0102956 A1 | 5/2004 | Levin | |
| 2004/0107097 A1 * | 6/2004 | Lenane et al. | 704/231 |
| 2004/0153306 A1 * | 8/2004 | Tanner et al. | 704/4 |
| 2005/0021323 A1 * | 1/2005 | Li | G06F 17/2735 704/5 |
| 2005/0075858 A1 * | 4/2005 | Pournasseh | G06F 17/289 704/2 |
| 2005/0131672 A1 * | 6/2005 | Dalal et al. | 704/2 |
| 2005/0131673 A1 * | 6/2005 | Koizumi et al. | 704/2 |
| 2005/0171944 A1 * | 8/2005 | Palmquist | G06F 17/2735 |
| 2005/0187774 A1 * | 8/2005 | Vuong | G06F 17/289 704/277 |
| 2005/0280557 A1 * | 12/2005 | Jha | H04W 8/22 340/988 |
| 2005/0288932 A1 * | 12/2005 | Kurzweil | G06K 9/00993 704/260 |
| 2006/0149558 A1 * | 7/2006 | Kahn et al. | 704/278 |
| 2006/0156233 A1 * | 7/2006 | Nurmi | 715/532 |
| 2006/0230346 A1 * | 10/2006 | Bhogal | G06F 17/2735 715/205 |
| 2006/0259307 A1 * | 11/2006 | Sanders et al. | 705/1 |
| 2007/0005363 A1 * | 1/2007 | Cucerzan et al. | 704/256 |
| 2007/0055739 A1 * | 3/2007 | Marmor | 709/217 |
| 2007/0100704 A1 * | 5/2007 | Liu et al. | 705/26 |
| 2007/0208813 A1 * | 9/2007 | Blagsvedt | G06F 17/289 709/206 |
| 2008/0021697 A1 * | 1/2008 | Cox et al. | 704/2 |
| 2008/0040096 A1 | 2/2008 | Osada et al. | |
| 2008/0082317 A1 * | 4/2008 | Rosart et al. | 704/8 |
| 2008/0086300 A1 * | 4/2008 | Anismovich et al. | 704/9 |
| 2008/0133216 A1 * | 6/2008 | Togami | 704/4 |
| 2008/0177529 A1 * | 7/2008 | Roberts | 704/2 |
| 2008/0195482 A1 * | 8/2008 | Sailer | 705/14 |
| 2008/0208593 A1 * | 8/2008 | Ativanichayaphong et al. | 704/275 |
| 2008/0228464 A1 * | 9/2008 | Al-Onaizan et al. | 704/3 |
| 2008/0261572 A1 * | 10/2008 | Tsui et al. | 455/414.2 |
| 2008/0263132 A1 * | 10/2008 | Saintloth | 709/203 |
| 2008/0275694 A1 * | 11/2008 | Varone | 704/9 |
| 2009/0006077 A1 * | 1/2009 | Keaveney | 704/9 |
| 2009/0006345 A1 * | 1/2009 | Platt et al. | 707/4 |
| 2009/0024394 A1 * | 1/2009 | Nakashima et al. | 704/275 |
| 2009/0048820 A1 * | 2/2009 | Buccella | 704/2 |
| 2009/0048821 A1 * | 2/2009 | Yam et al. | 704/3 |
| 2009/0058860 A1 * | 3/2009 | Fong et al. | 345/467 |
| 2009/0125295 A1 * | 5/2009 | Drewes | 704/3 |
| 2009/0150156 A1 * | 6/2009 | Kennewick | G06Q 30/0261 704/257 |
| 2009/0177462 A1 * | 7/2009 | Alfven | 704/3 |
| 2009/0210214 A1 * | 8/2009 | Qian | G06F 17/30669 704/2 |
| 2010/0094630 A1 * | 4/2010 | Yoakum | 704/254 |
| 2010/0135478 A1 * | 6/2010 | Wald et al. | 379/202.01 |
| 2010/0161311 A1 * | 6/2010 | Massuh | 704/7 |
| 2010/0180198 A1 * | 7/2010 | Iakobashvili et al. | 715/257 |

FOREIGN PATENT DOCUMENTS

| | | |
|---|---|---|
| JP | 04111654 A | 4/1992 |
| JP | 2000-194698 A | 7/2000 |
| JP | 2003-114887 A | 4/2003 |
| JP | 2003-330916 A | 11/2003 |
| JP | 2004-127112 A | 4/2004 |
| JP | 2005-331608 A | 12/2005 |
| JP | 2006-129002 A | 5/2006 |
| JP | 2006268710 A | 10/2006 |
| WO | 2005091166 A2 | 9/2005 |

OTHER PUBLICATIONS

Office Action received for Japanese Patent Application No. 2009-283930, mailed Mar. 27, 2012, 3 pages of Japanese Office Action and 3 pages of unofficial English translation.

Office Action received for Chinese Patent Application No. 200910260621.2, mailed Aug. 10, 2012, 4 pages of Chinese Office Action and 2 pages of unofficial English translation.

Official Communication received for European Patent Application No. 09252783.7, mailed Jan. 29, 2013, 5 pages.

Siemens AG, "Location Based Translators," Oct. 2006, 4 pages.

Anonymous, "Location-based dictionary", Research Disclosure, Mason Publications, Hampshire, GB, vol. 524, No. 26, Dec. 1, 2007, p. 1262, ISSN: 0374-4353.

Office Action received for Japan Patent Application No. 2009-283930, mailed on Feb. 26, 2013, 3 pages of Japanese Office Action and 3 pages of unofficial English translation.

Office action received for Chinese Patent Application No. 200910260621.2, mailed on Apr. 26, 2011, 8 pages of Office action and 9 pages of English Translation (unofficial).

* cited by examiner

METHOD, APPARATUS AND SYSTEM FOR LOCATION ASSISTED TRANSLATION

BACKGROUND

Visitors to foreign countries are frequently faced with language barriers, amongst other issues. Additionally, even if the visitor is somewhat familiar with the language, use of local or colloquial terms and phrases may still cause confusion and/or difficulty. Vendors such as Babel Fish (Yahoo), Google and a variety of others currently provide utilities that are able to translate text as well as web pages from one language to another. For text translation, for example, a user may specify "from" and "to" languages, and the translator may then start looking for matches on its internal dictionaries. If, and when, a match is found, the translation may be provided back to the user. An overview of this process is illustrated in FIG. 1. Specifically, User 105 may provide a Word and/or Phrase 110 to a translation utility, Trans Utility 115. Upon receipt of Word/Phrase 110, Translation Utility 115 may determine the language Word/Phrase 110 is to be translated to and retrieve Standard Language Dictionary 120 for that specific language. Thereafter Translation Utility 115 may translate Word/Phrase 110 to Translated Word/Phrase 125 and provide the translation back to User 105.

Typical heuristics/factors used for translation today are based on the character set of the text, the number of matches of the words of a sentence on the corresponding language dictionaries, the surrounding words, position in a sentence and/or punctuations. These heuristics are useful but not comprehensive, especially for languages that are used among several countries, regions or cultures, where the same sentence or word can have the same spelling, character set and context but mean completely different things depending on the place where that sentence was used. For example, when translating the word "borde" from Spanish to English, at least two meanings may be correct: "edge" and "arrogant person." In South America, "borde" is understood only as "edge" but in Spain, on the other hand, "borde" may mean either "edge" or "arrogant person". If more than one match is found, i.e., a matched word has several possible meanings in the "to" language, existing utilities typically select and present the most common meaning to the user.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a scheme for enhancing translation results on translation applications running on mobile devices. As used in this specification, the phrases "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment. Additionally, reference in the specification to the term "device", "machine" or "apparatus" may include any one of a number of processor based computing devices, including but not limited to desktop computing devices, portable computing devices (laptops as well as handhelds), set-top boxes, and game consoles. Handheld devices may include, but are not limited to, personal digital assistants (PDAs), mobile internet devices (MIDs), laptops, digital cameras, media players, ultra mobile personal computers (UMPCs) and/or any computing device that is capable of roaming on, and connecting to, a network.

In one embodiment of the invention, mobile devices capable of running location awareness protocols may leverage location information to enhance translation results. More specifically, these location aware mobile devices (hereafter "LA Devices") may utilize the location information to enhance performance of any translation scheme capable of running on a device. Thus, for example, embodiments of the present invention may be coupled to or integrated with any existing or future translation utility to improve the accuracy of translations by correlating location information with the translation engine. In other words, one embodiment of the invention enables translation engines to utilize an additional heuristic to further improve on translation accuracy.

Figure 1:
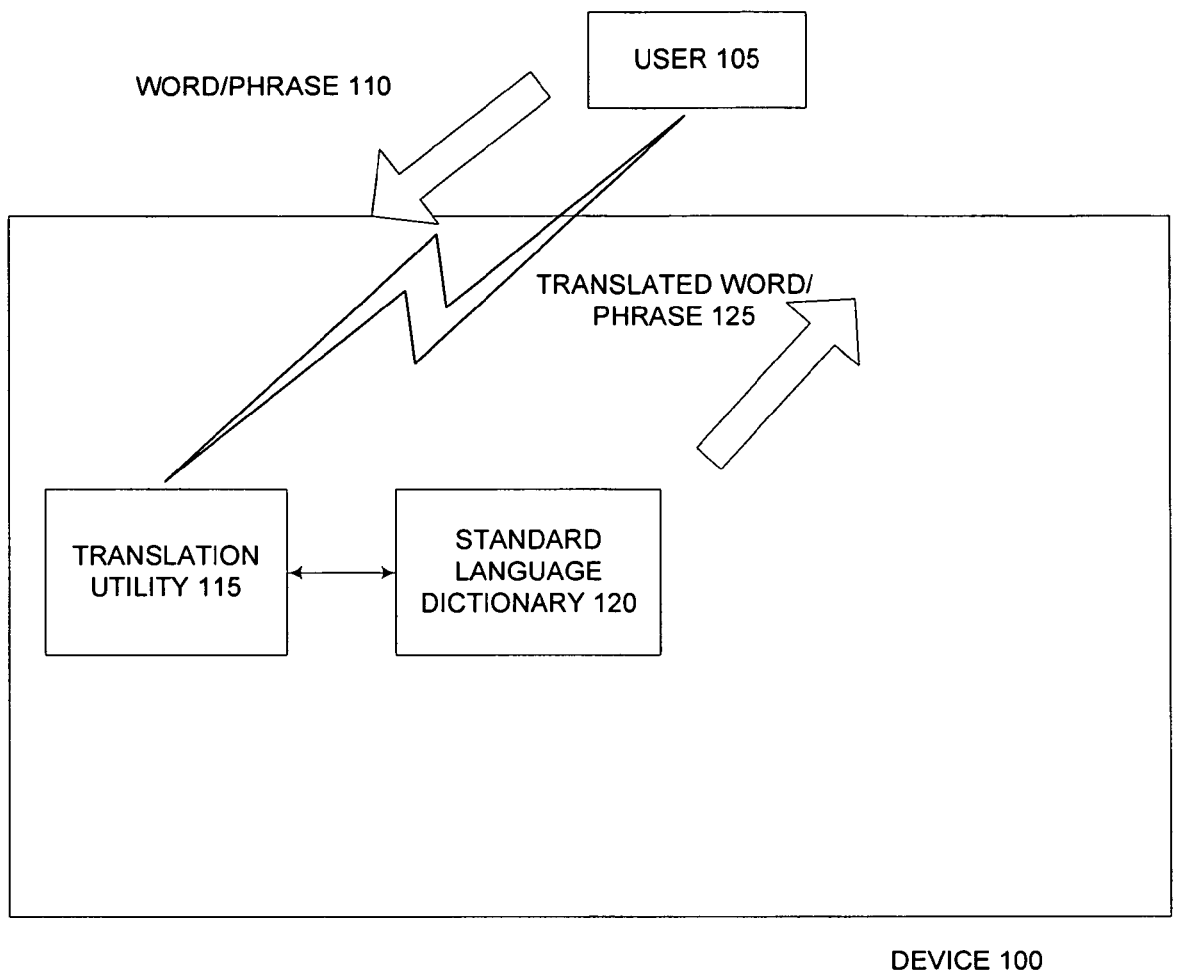
FIG. 1 illustrates an overview of a typical translation process.
Figure 2:
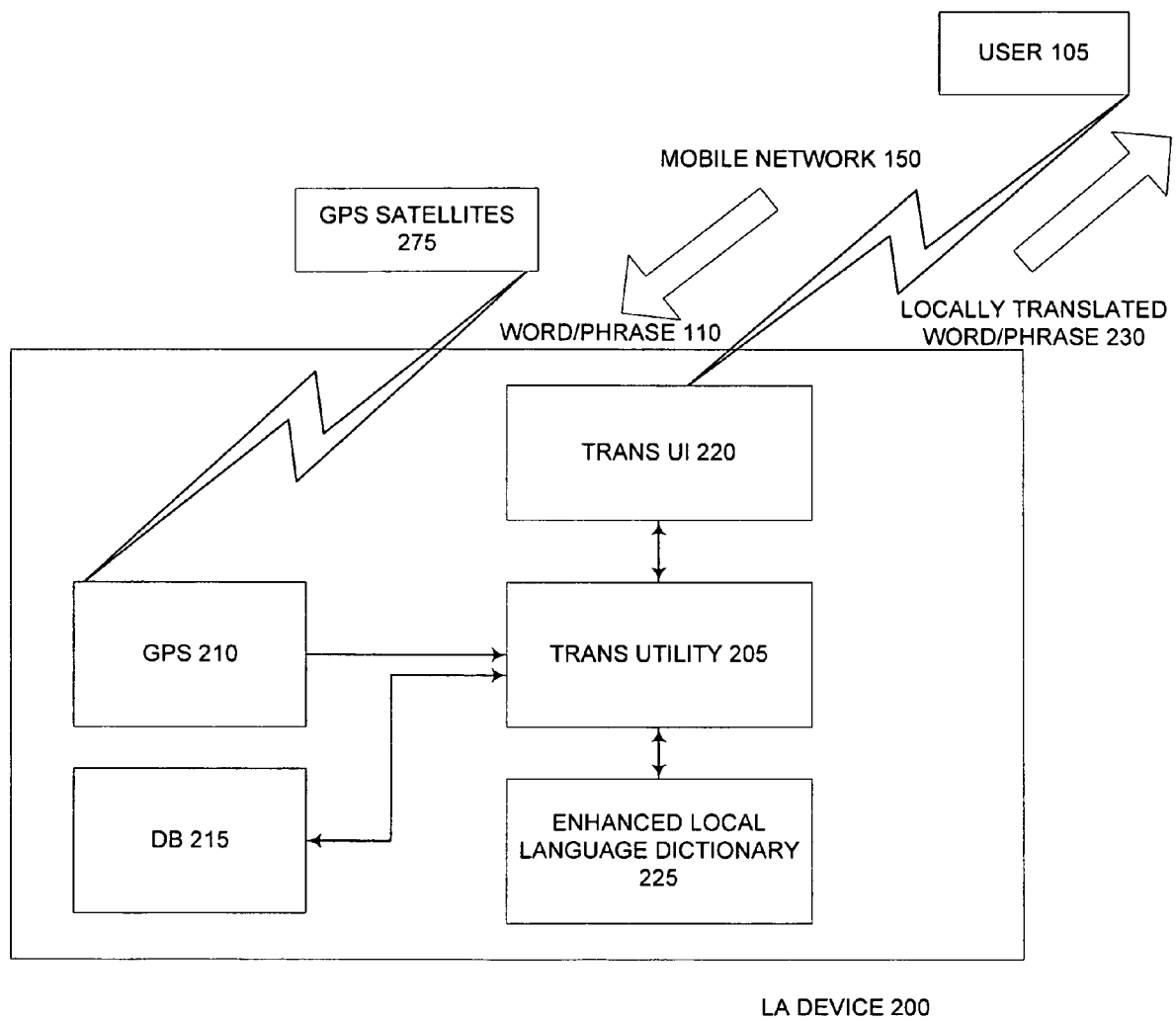
FIG. 2 illustrates a system according to an embodiment of the present invention.

FIG. 2 illustrates an embodiment of the present invention as applied to the Spanish word "borde", previously discussed above. As illustrated, User 105 above may have a location aware device ("LA Device 200") that includes or is coupled to a translation utility ("Trans Utility 205"). Although Trans Utility 205 is illustrated herein as residing on LA Device 200, other embodiments of the invention are not so limited. In other embodiments, Trans Utility 205 may, for example, be coupled to LA Device 200 and/or be a remote service provided by a third party. If LA Device 200 is a mobile internet device ("MID"), for example, the device may access a remote translation service such as Babel Fish on Yahoo to perform a translation. In yet another embodiment, LA Device 200 may include Trans Utility 205 locally as well as be coupled to (wirelessly or otherwise) to a remote translation utility. Hereafter, any reference to "Trans Utility 205" or simply "translation utility" shall not be limited to one or the other and may include one or both utilities running on the device and utilities accessible by the device.

LA Device 200 device may be coupled to a mobile communications network ("Mobile Network 150") and to (or have integrated within it) a location awareness module such as a Global Positioning System receiver (hereafter "GPS 210"). GPS 210 may comprise any module capable of identifying the location of LA Device 200 utilizing now known or later developed location awareness technology. Thus, existing GPS 210 may be coupled to GPS Satellites 275, which transmits microwave signals that enable GPS 210 to determine its current location. Although the present application is written with respect to GPS, embodiments of the invention are not so limited and may be practiced with any existing or future form of location awareness or location detection schemes. Examples of other location awareness schemes include but are not limited to triangulation of wireless (WiFi) signals and/or 3G signals. These schemes are well known in the art and descriptions thereof are omitted herein in order not to obscure embodiments of the present invention.

User 105 may once again provide Word/Phrase 110 to LA Device 200 for translation via a translation user interface ("Trans UI 220"). Once LA Device 200 determines the language to translate to and additionally compares the location information from GPS 210 to a data repository containing reverse geographical codes ("DB 215"), the specific physical location of LA Mobile Device 200 may be identified. Thus, according to one embodiment, for example, based on the information from GPS 210, Device 200 may identify its location on a map. In various embodiments of the invention, DB 215 may reside on LA Device 200, be coupled to LA Device 200 and/or reside on a remote device (e.g., the Yahoo server, servicing Babel Fish).

Based on the information in DB 215, LA Device 200 may retrieve reverse geographical information, i.e. utilize the location information on the map, LA Device 200 may pin point its physical location to a specific street and/or address in a country. Thus, for example, LA Device 200 has pin pointed its location to a specific region of Spain and in one embodiment, LA Device 200 may then determine whether an enhanced local language dictionary exists for the language. In one embodiment, enhanced local language dictionaries may include typical language translations as well as specific local dialect and/or idiosyncratic information, thus enabling a translation utility to more accurately translate a word/phrase. If an enhanced local language dictionary does exist for that specific region in Spain, LA Device 200 may retrieve the dictionary ("Enhanced Local Language Dictionary 225"). If, however, no such local language directory exists, then LA Device 200 may simply retrieve Standard Language Dictionary 120.

Thereafter, when a user attempts to translate a word or phrase, the user may enter the word/phrase to LA Device 220 via a Trans UI 280. According to embodiments of the invention, Trans UI 280 may accept words/phrases entered via text entry as well as any other forms of data entry, such as voice commands, without departing from the spirit of embodiments of the invention. LA Device 200 may thereafter utilize the previously downloaded Enhanced Local Language Directory 225 that includes translations specific to that region on Spain. Thus, the Spanish word "borde" discussed in the example above in Spain may now be translated to Translated Word/Phrase 230 as meaning both "edge" and "arrogant person", allowing the user to make an accurate selection based on context. If, on the other hand, the user travels to Argentina or elsewhere in South America, LA Device 200 may once again retrieve location information based on reverse geographical codes from DB 215 and retrieve the appropriate translations for that region. The user may thus type in the same word in Argentina and receive only one translation of "borde" ("edge"), as is appropriate for the local dialect at that location.

Figure 3:
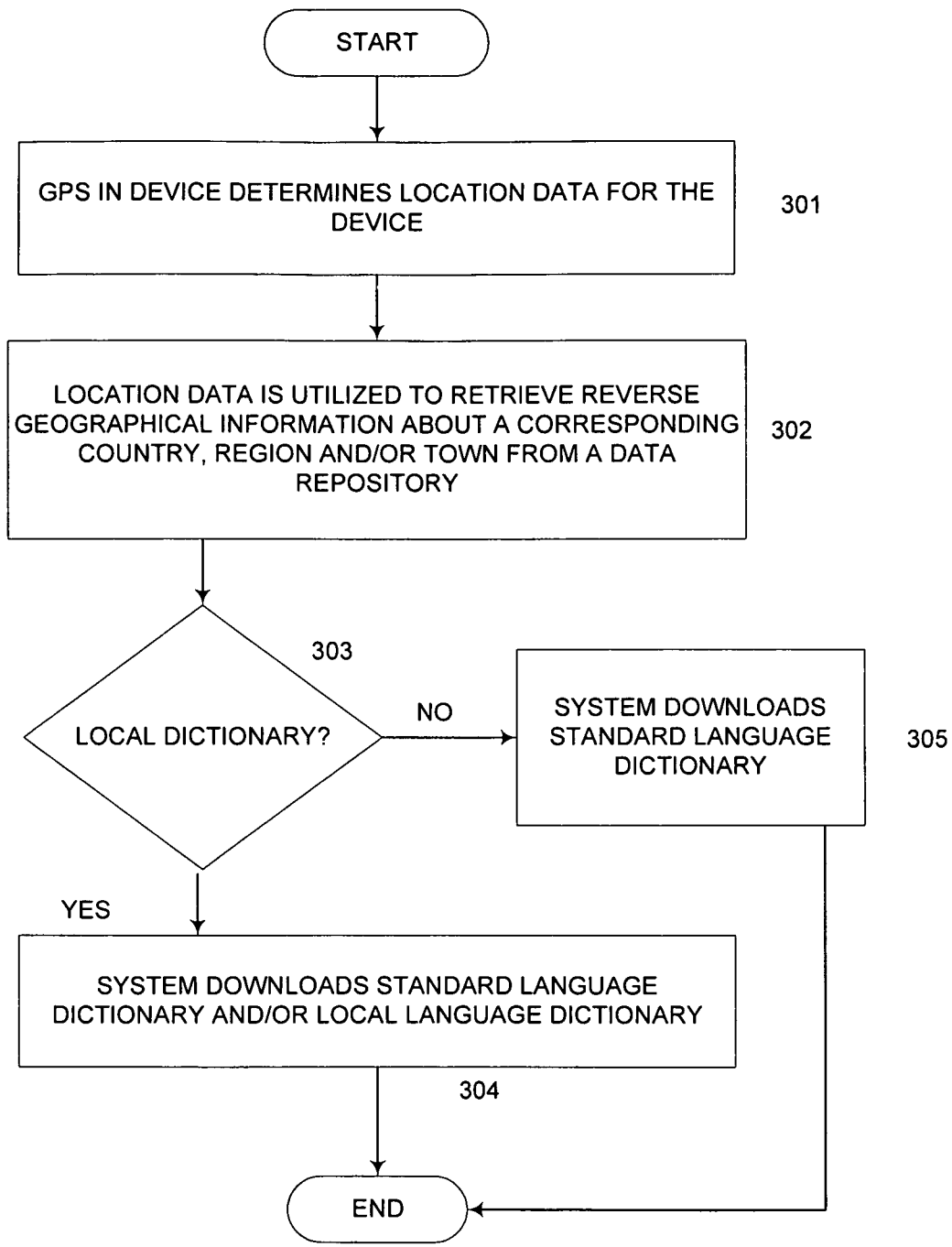
FIG. 3 is a flow chart illustrating the enhanced translation according to an embodiment of the present invention.

FIG. 3 is a flow chart illustrating one embodiment of the present invention. Although the following operations may be described as a sequential process, many of the operations may in fact be performed in parallel and/or concurrently. In addition, one or more embodiments, the order of the operations may be re-arranged without departing from the spirit of embodiments of the invention. In 301, a device including a GPS system may determine location data for the device (e.g., longitude/latitude or other such location scheme). The basic location data may in 302 be utilized by a translation utility to retrieve reverse geographical information about a corresponding country, region and/or town from a database. In one embodiment, once the specific physical geographical location is identified, in 303, the translation utility may determine whether an enhanced local language dictionary exists for that geographical location. If it does, the translation module may download the enhanced local language dictionary in 304. If, however, an enhanced local language dictionary does not exist, the device may simply download a standard language dictionary appropriate for the language (although not localized) in 305. Thereafter, the dictionaries may be available to the translation utility to provide the user with translations.

The scheme according to embodiments of the present invention may be implemented on a variety of computing devices. According to an embodiment, a computing device may include various other well-known components such as one or more processors which can be specialized Reduced Instruction Set Computer (RISC) engines or general purpose processing engines. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including Ethernet, Gigabit Ethernet, PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:

determining, by a mobile device running location awareness protocols to leverage location information, location data for the mobile device that identifies a current location of the mobile device;

comparing, by the mobile device, the location data to a list of reverse geographical codes that correlates location data to physical geographical locations;

retrieving, by the mobile device, a physical geographical location from the list of reverse geographical codes based on the location data, the physical geographical location corresponding to the current location of the mobile device;

receiving, by the mobile device, a request to translate a first word from a local dialect of a standard language spoken in the physical geographical location of the mobile device to a language to be translated to, wherein the first word from the local dialect of the standard language comprises several possible meanings in the language to be translated to;

retrieving, by the mobile device, multiple local translated words corresponding to the first word received for translation from an enhanced local language dictionary including local dialect information for the physical geographical location, wherein the local dialect information associates the first word from the local dialect of the standard language with the several possible meanings based on the current location of the mobile device, wherein the several possible meanings are different from a meaning associated with the first word in the standard language, and wherein each of the multiple local translated words having a separate one of the several possible meanings in the language the first word is translated to; and providing, by the mobile device, the retrieved multiple local translated words to a user of the mobile device for contextual-based selection of one of the multiple local translated words having an appropriate meaning.

2. The method of claim 1, wherein the location data comprises latitude and longitude data.

3. The method of claim 2, wherein the list of reverse geographical codes includes a plurality of latitude and longitude data, each of the plurality of latitude and longitude data corresponding to a specific physical geographical location.

4. The method of claim 3, wherein determining the location data further comprises accessing a location detection system to determine the location data for the mobile device.

5. The method of claim 4, wherein the list of reverse geographical codes is stored in a data repository.

6. The method of claim 5, further comprising accessing a translation utility to access the enhanced local language dictionary.

7. The method of claim 6, wherein the translation utility may be at least one of located on the mobile device and be coupled to the mobile device.

8. A method comprising:

identifying, by a mobile device running location awareness protocols to leverage location information, location data for the device, the location data corresponding to the current location of the mobile device;

checking, by the mobile device, the identified location data for the device against a data repository of reverse geographical codes to identify a specific physical location of the mobile device corresponding to the current location of the mobile device, the reverse geographical codes correlate location data to physical geographical locations;

receiving, by the mobile device, a request to translate a first word from a local dialect of a standard language spoken in the specific physical geographical location of the mobile device to a language to be translated to, wherein the first word from the local dialect of the standard language comprises several possible meanings in the language to be translated to;

retrieving, by the mobile device, multiple local translated words corresponding to the first word received for translation from an enhanced local language dictionary including local dialect information for the specific physical geographical location, wherein the local dialect information associates the first word from the local dialect of the standard language with the several possible meanings based on the current location of the mobile device, wherein the several possible meanings are different from a meaning associated with the first word in the standard language, and wherein each of the multiple local translated words having a separate one of the several possible meanings in the language the first word is translated to; and providing, by the mobile device, the retrieved multiple local translated words to a user of the mobile device for contextual-based selection of one of the multiple local translated words having an appropriate meaning.

9. The method of claim 8, wherein identifying location data for the mobile device comprises providing the location data for the mobile device using a location detection system.

10. The method of claim 9, wherein the location detection system is at least one of a global positioning system, a WiFi system and a 3G system.

11. A system, comprising:

a location identification module to determine location data for a mobile device that identifies a current location of the mobile device by running location awareness protocols to leverage location information; and a translation module coupled to the location identification module to:
(i) compare the determined location data to a list of reverse geographical codes that correlate location data to physical geographical locations,
(ii) retrieve a physical geographical location from the list of reverse geographical codes corresponding to the current location of the mobile device,
(iii) receive a request to translate a first word from a local dialect of a standard language spoken in the physical geographical location of the mobile device to a language to be translated to, wherein the first word from the local dialect of the standard language comprises several possible meanings in the language to be translated to,
(iv) retrieve multiple local translated words corresponding to the first word received for translation from an enhanced local language dictionary including local dialect information for the physical geographical location, wherein the local dialect information associates a first word from the local dialect of the standard language with several possible meanings based on the current location of the mobile device, wherein the several possible meanings are different from a meaning associated with the first word in the standard language, and wherein each of the multiple local translated words having a separate one of the several possible meanings in the language the first word is translated to, and
(v) provide the retrieved multiple local translated words to a user of the mobile device for contextual-based selection of one of the multiple local translated words having an appropriate meaning.

12. The system of claim 11, wherein the location identification module is a location detection system and the data comprises latitude and longitude data.

13. The system of claim 12, wherein the translation module to compare the determined location data comprises to compare the determined location data to a plurality of latitude and longitude data in the list of reverse geographical codes, each of the plurality of latitude and longitude data corresponding to a specific physical geographical location.

14. The system of claim 11, further comprising a data repository coupled to at least one of the location identification module and the translation module, the data repository including the list of reverse geographical codes.

15. The system of claim 14, wherein the translation module is at least one of locally coupled to the mobile device and remotely coupled to the mobile device.

16. A non-transitory machine-accessible medium having stored thereon instructions that, when executed by a machine, cause the machine to:

determine location data for the machine that identifies a current location of the machine by running location awareness protocols to leverage location information;

compare the location data to a list of reverse geographical codes, the list of reverse geographical codes correlates location data to physical geographical locations;

retrieve a physical geographical location from the list of reverse geographical codes based on the location data, the physical geographical location corresponding to the current location of the machine;

receive a request to translate a first word from a local dialect of a standard language spoken in the physical geographical location of the machine to a language to be translated to, wherein the first word from the local dialect of the standard language comprises several possible meanings in the language to be translated to;

retrieve multiple local translated words corresponding to the first word received for translation from an enhanced local language dictionary including local dialect information for the physical geographical location, wherein the local dialect information associates the first word from the local dialect of the standard language with the several possible meanings based on the current location of the machine, wherein the several possible meanings are different from a meaning associated with the first word in the standard language, and wherein each of the multiple local translated words having a separate one of the several possible meanings in the language the first word is translated to; and provide the retrieved multiple local translated words to a user of the machine for contextual-based selection of one of the multiple local translated words having an appropriate meaning.

17. The non-transitory machine-accessible medium of claim 16, wherein the instructions, when executed by the machine, further cause the machine to identify the location data comprising latitude and longitude data.

18. The non-transitory machine-accessible medium of claim 17, wherein the list of reverse geographical codes includes a plurality of latitude and longitude data, each of the plurality of latitude and longitude data corresponding to a specific physical geographical location.

19. The non-transitory machine-accessible medium of claim 16, wherein the instructions, when executed by the machine, further cause the machine to determine the location data by accessing a location detection system to determine the location data for the machine.

20. The non-transitory machine-accessible medium of claim 16, wherein the list of reverse geographical codes is stored in a data repository.

21. The non-transitory machine-accessible medium of claim 20, wherein the instructions, when executed by the machine, further cause the machine to access a translation utility to access the enhanced local language dictionary.

22. The non-transitory machine-accessible medium of claim 21, wherein the translation utility may be at least one of located on the machine or be coupled to the machine.

* * * * *